United States Patent [19]

Mizobe

[11] Patent Number: 5,057,974
[45] Date of Patent: Oct. 15, 1991

[54] SYSTEM FOR UNIFORMLY ILLUMINATING LIQUID CRYSTAL DISPLAY BOARD FROM REAR SIDE

[76] Inventor: Tatsuji Mizobe, 1-21-3, Sugano, Ichikawa-Shi, Chiba-Ken, Japan

[21] Appl. No.: 541,944

[22] Filed: Jun. 22, 1990

[51] Int. Cl.$^5$ .............................................. F21V 8/00
[52] U.S. Cl. ....................................... 362/26; 362/27; 362/31; 362/331
[58] Field of Search .................. 362/31, 26, 27, 331, 362/812, 311; 40/546

[56] References Cited

U.S. PATENT DOCUMENTS

| | | | |
|---|---|---|---|
| 3,328,570 | 6/1967 | Balchunas | 362/31 |
| 4,096,550 | 6/1978 | Boller et al. | 362/31 |
| 4,642,736 | 2/1987 | Masuzawa et al. | 362/31 |
| 4,714,983 | 12/1987 | Lang | 362/31 |
| 4,729,067 | 3/1988 | Ohe | 362/31 |
| 4,860,171 | 8/1989 | Kojima | 362/31 |

Primary Examiner—Ira S. Lazarus
Assistant Examiner—Sue Hagarman
Attorney, Agent, or Firm—Cushman, Darby & Cushman

[57] ABSTRACT

A system for uniformly illuminating a liquid crystal display board from the rear side includes a main body as an essential component. The main body includes a transparent substrate made of transparent resin, a first coated layer on the front surface of the transparent substrate made of transparent resin having a refractive index different from that of the transparent substrate, a second coated layer on the rear surface of the transparent substrate made of transparent resin having a refractive index different from that of the transparent substrate and a rugged layer on the second coated layer made of transparent resin suitably employable for forming an underlying layer. A plurality of light sources each in the form of a fluorescent lamp are arranged in the transparent substrate in a spaced relationship. The rugged layer has a number of light reflecting means in the form of concavities and convexities formed on the front surface of the rugged layer for the purpose of irregularly reflecting light from each fluorescent lamp. The light reflecting means are distributed with a density per unit area which is determined to increase in inverse proportion to a square of the distance as measured from each fluorescent lamp to keep brightness substantially uniform over the whole surface of the transparent substrate.

8 Claims, 2 Drawing Sheets

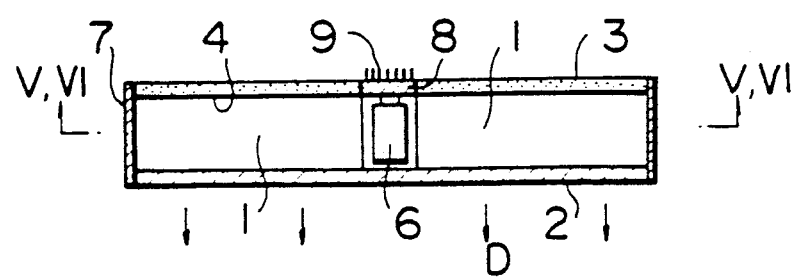
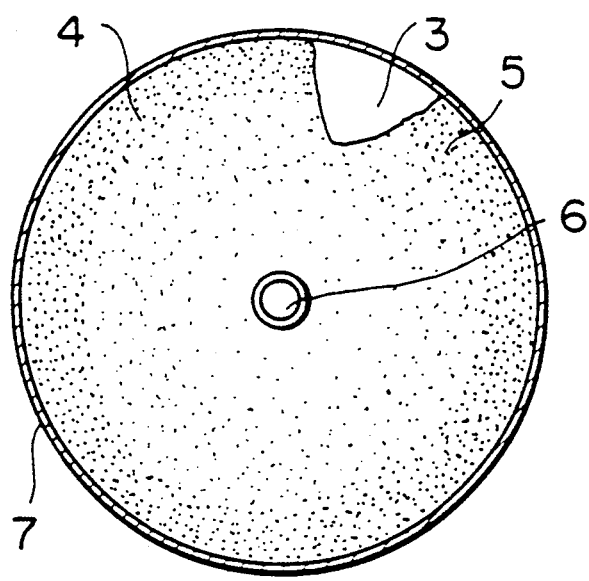
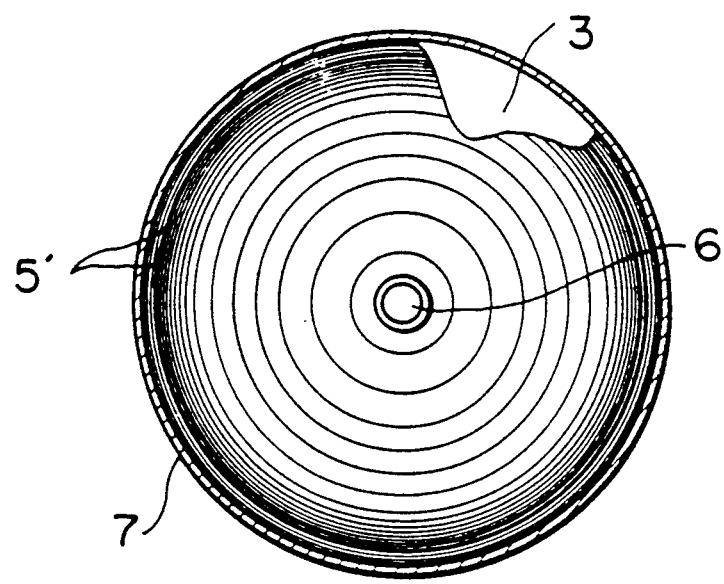

SYSTEM FOR UNIFORMLY ILLUMINATING LIQUID CRYSTAL DISPLAY BOARD FROM REAR SIDE

BACKGROUND OF THE INVENTION

1. Field of the Invention

The present invention relates to a system for uniformly illuminating a liquid crystal display board from the rear side wherein a parallel light beam is emitted in the form of reflected light from a main body located behind the liquid crystal display board with substantially uniform brightness over the whole surface of the screen of the liquid crystal display board.

2. Description of the Prior Art

In recent years, a number of liquid crystal display boards have been increasingly used for word processors, personal computers and so forth to display characters, numerals or the like with a high degree of resolution. To practically activate the liquid crystal display board, a plurality of large scale integrated circuits are incorporated in a work station for each word processor or personal computor.

With the conventional liquid crystal display board practically used in that way, it has been found that the liquid crystal display board has the following drawbacks.

Although the liquid crystal display board has a high degree of resolution, it is not easy to allow brightness to be substantially uniformly distributed over the whole surface of the liquid crystal display board. In practice, brightness decreases more and more in inverse proportion to a square of the distance as measured from a light source with the result that characters, numerals or the like on the screen of the liquid crystal display board are not uniformly visually recognized by an operator who is sitting in front of the word processor, personal computor or the like.

To assure that characters, numerals or the like on the screen of the liquid crystal display board are more clearly recognized by the operator, a proposal has been made such that light generated by a lamp is reflected at a reflective mirror which is disposed behind the liquid crystal display board and of which surface is treated to a frosted plane so that a parallel light beam is emitted toward the liquid crystal display board from the reflective mirror. With this proposal, however, brightness is not satisfactorily uniformly distributed over the whole surface of the liquid crystal display board. In addition, it is not easy to provide a high degree of brightness for the screen of the liquid crystal display board with the aforementioned proposal. Moreover, arrangement of the reflective mirror has been accomplished at expensive cost.

SUMMARY OF THE INVENTION

The present invention has been made with the foregoing background in mind.

An object of the present invention is to provide a system for uniformly illuminating a liquid crystal display board from the rear side wherein brightness is uniformly distributed over the whole surface of the liquid crystal display board.

Another object of the present invention is to provide a system for uniformly illuminating a liquid crystal display board from the rear side wherein the system is constructed at inexpensive cost.

To accomplish the above objects, there is provided according to one aspect of the present invention a system for uniformly illuminating a liquid crystal display board from the rear side, wherein the system includes as an essential component a rectangular main body located behind the liquid crystal display board in a spaced relationship, the main body having a configuration substantially identical to that of the liquid crystal display board and including a rectangular transparent substrate made of transparent resin, a first coated layer deposited on the front surface of the transparent substrate with transparent resin, the first coated layer having a refractive index different from that of the transparent substrate, a second coated layer deposited on the rear surface of the transparent substrate resin, the second coated layer having a refractive index different from that of the transparent substrate, a rugged layer deposited on the second coated layer with transparent resin suitably employable for forming an underlying layer, the rugged layer including a number of light reflecting means in the form of concavities and convexities on the front surface of the rugged layer for irregularly reflecting light from each light source, the light reflecting means being distributed with a density per unit area which increases in inverse proportion to a square of the distance as measured from each light source to keep brightness substantially uniform over the whole surface of the transparent substrate, and a plurality of light sources for generating light to be irradiated in the interior of the transparent substrate.

The light reflecting means are formed in a dot-shaped pattern as viewed from the front side.

Alternatively, the light reflecting means may be formed in a straight line-shaped pattern as viewed from the front side.

Usually, a fluorescent lamp is employed for the respective light sources, and the fluorescent lamps are arranged in the transparent substrate in a spaced relationship.

Alternatively, four fluorescent lamps may be arranged along four sides of the transparent substrate.

Further, according to another aspect of the present invention, there is provided a system for uniformly illuminating a liquid crystal display board from the rear side, wherein the system includes as an essential component a circular main body located behind the liquid crystal display board in a spaced relationship, the main body having a configuration substantially identical to that of the liquid crystal display board and including a circular transparent substrate made of transparent resin, a first coated layer deposited on the front surface of the transparent substrate with transparent resin, the first coated layer having a refractive index different from that of the transparent substrate, a second coated layer deposited on the rear surface of the transparent substrate with transparent resin, the second coated layer having a refractive index different from that of the transparent substrate, a rugged layer deposited on the second coated layer with transparent resin suitably employable for forming an underlying layer, the rugged layer including a number of light reflecting means in the form of concavities and convexities on the front surface of the rugged layer for irregularly reflecting light from a light source, the light reflecting means being distributed with a density per unit area which increases in inverse proportion to a square of the distance as measured from the light source to keep brightness substantially uniform over the whole surface of the transparent substrate, and a single light source disposed at the central part of the transparent substrate for generating light to be irradiated in the interior of the transparent substrate.

The light reflecting means are formed in a dot-shaped pattern as viewed from the front side.

Alternatively, the light reflective means may be formed in a concentric circular line-shaped pattern as viewed from the front side.

As the light sources are turned on, light is irradiated toward the light reflecting means in the transparent substrate. Irregularly reflected light is repeatedly reflected further in the transparent substrate between the coated layers, whereby a parallel light beam is emitted from the transparent substrate through the front coated layer. Since a density of distribution of the light reflecting means per unit is determined to increase in inverse proportion to a square of the distance as measured from each light source, brightness is substantially uniformly distributed over the whole surface of the screen of the liquid crystal display board with the result that characters, numerals or the like on the screen of the liquid crystal display board are clearly visually recognized by an operator.

Other objects, features and advantages of the present invention will become apparent from reading of the following description which has been made with reference to the accompanying drawings.

BRIEF DESCRIPTION OF THE DRAWINGS

The present invention is illustrated in the following drawings in which:

FIG. 4 is a sectional plan view of a main body for a system for uniformly illuminating a circular liquid crystal display board from the rear side in accordance with another embodiment of the present invention;

FIG. 5 is a vertical sectional view of the main body taken along line V—V in FIG. 4, particularly illustrating a number of light reflecting means arranged in a dot-shaped pattern;

FIG. 6 is a vertical sectional view of the main body taken along line VI—VI in FIG. 4, particularly illustrating a number of light reflecting means arranged in a concentric circular line-shaped pattern.

DESCRIPTION OF THE PREFERRED EMBODIMENTS

Now, the present invention will be described in detail hereinafter with reference to the accompanying drawings which illustrate preferred embodiments thereof.

Figure 1:
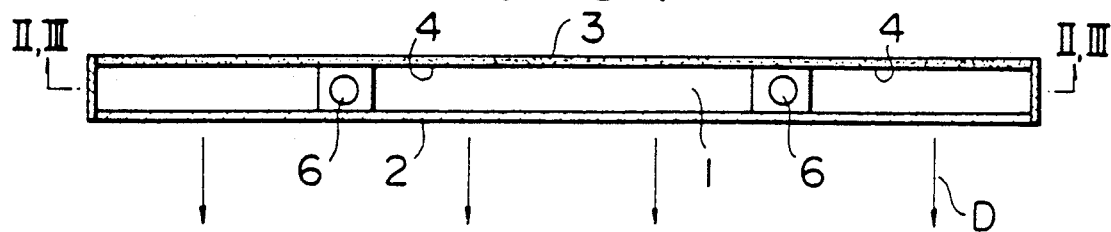
FIG. 1 is a sectional plan view of a main body for a system for uniformly illuminating a rectangular liquid crystal display board from the rear side in accordance with an embodiment of the present invention.
Figure 2:
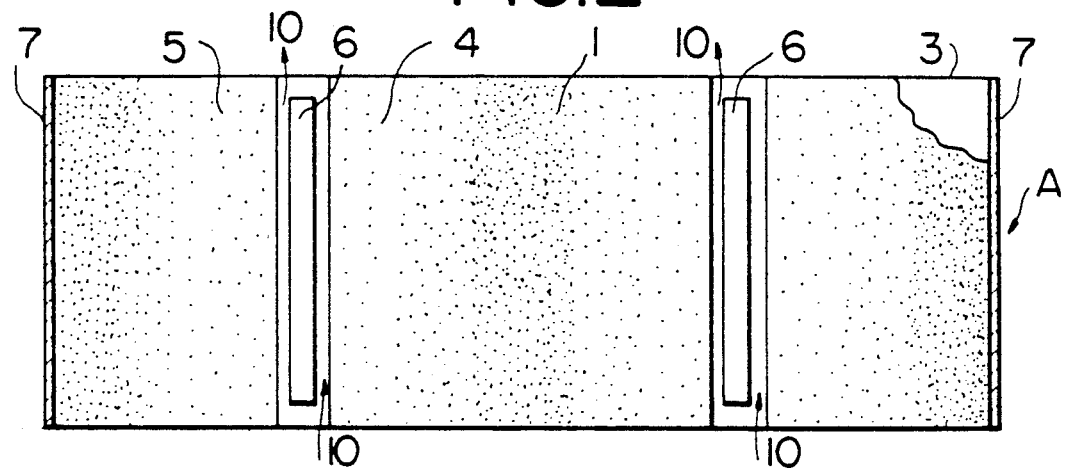
FIG. 2 is a vertical sectional view of the main body taken in along line II—II in FIG. 1, particularly illustrating a number of light reflecting means arranged in a dot-shaped pattern.

FIGS. 1 and 2 illustrate a system for uniformly illuminating a rectangular liquid crystal display board (not shown) from the rear side in accordance with an embodiment of the present invention. FIG. 1 is a sectional plan view of the system and FIG. 2 is a vertical sectional view of the system taken in line II—II in FIG. 1. The system includes as an essential component a main body A in the form of a transparent plate and two lamps 6 arranged in the interior of the main body A each serving as a light source. The main body A is constructed in the following manner. Specifically, the main body A includes a thin transparent substrate 1 made of, e.g., acrylic resin or the like material having an excellent light permeability, and coated layers 2 and 3 are deposited on front and rear surfaces of the substrate 1. In addition, a rugged layer 4 having a large number of concavities and convexities formed on the front surface thereof is interposed between the rear surface of the transparent substrate 1 and the coated layer 3 by employing a coating process. Each of the concavities and the convexities is dimensioned within the range of 2 microns to 3 microns so that it can not visually be recognized by eyes of an operator who is sitting in front of the liquid crystal display board. Therefore, such concavities and convexities have no effect on the background as viewed in the thickness direction of the transparent substrate 1. In practice, the concavities and the convexities on the rugged layer 4 serve as light reflecting means identified by reference numeral 5. A density of distribution of the light reflecting means 5 per unit area is determined in inverse proportion to a square of the distance as measured from each stationary light source 6 to keep brightness substantially uniform over the whole surface of the transparent substrate 1.

In the shown embodiment of the present invention, the light reflecting means 5 are formed on the rugged layer 4 in a dot-shaped pattern as viewed from the front side by employing a conventional screen printing process or the like. After completion of the printing operation, the transparent substrate 1 having a number of light reflecting means 5 formed on the coated layer 3 is placed in a baking oven (not shown) so that the light reflecting means 5 are baked at a lower temperature in the oven. Thus, the light reflecting means 5 are immovably deposited on the coated layer 3 of the transparent substrate 1.

Usually, a fluorescent lamp is used for each light source 6. As is well known, the fluorescent lamp 6 has optical characteristics that brightness in the middle part is higher than that at opposite ends of the fluorescent lamp. As is apparent from FIG. 2, a density of the light reflecting means 5 per unit area is distributed in inverse proportion to a square of the distance as measured from the fluorescent lamp 6. To assure that brightness is substantially uniformly distributed over the whole surface of the transparent substrate 1, a density of distribution of the light reflecting means 5 per unit area is practically determined to increase in inverse proportion to a square of the distance as measured from each light source 6, as mentioned above. With such construction, when the liquid crystal display board is practically used, the fluorescent lamps 6 are turned on. Light is irradiated from the fluorescent lamps 6 in the interior of the transparent substrate 1 toward the light reflecting means 5. As light is irradiated in that way, irregularly reflected light is repeatedly reflected further in the interior of the transparent substrate 1 between the both coated layers 2 and 3, whereby correctly reflected light in the form of a parallel light beam as identified by an arrow mark D in FIG. 1 is emitted toward the liquid crystal display board from the transparent substrate 1 through the coated layer 2, while exhibiting substantially uniform distribution of brightness across the whole front surface of the main body A.

In FIG. 2, reference numeral 7 designates an end plate at opposite ends of the transparent substrate 1 for the purpose of preventing light from being uselessly emitted to the outside therethrough.

Next, operation of the system as constructed in the above-described manner will be described below.

When the fluorescent lamps 6 are turned on, light generated by the fluorescent lamps 6 is irradiated in the interior of the transparent substrate 1 so that it collides with the light reflecting means 5 on the rugged layer 4 of the coated layer 3 on the rear surface of the transparent substrate 1 with a density of distribution of the light reflecting means 5 per unit area which is determined to increase in inverse proportion to a square of the distance as measured from each fluorescent lamp 6 to assure substantially uniform distribution of brightness over the whole surface of the transparent substrate 1. The light reflecting means 5 are prepared in the form of concavities and convexities on the coated layer 3 on the rear surface of the transparent substrate 1 by using special ink suitably employable for forming an underlying layer for the purpose of light reflection, whereby light is irregularly reflected along normal lines (not shown) extending at a right angle relative to the surface of each concavity and convexity. As light is repeatedly reflected in that way, a phenomenon of light illumination appears with light forwardly coming from the light reflecting means 5 while forming a parallel light beam in the D arrow-marked direction. To assure that brightness is substantially uniformly distributed across the whole surface of the transparent substrate 1, a density of arrangement of the light reflecting means 5 per unit area is determined to increase in inverse proportion to a square of the distance as measured from each fluorescent lamp 6, whereby correctly reflected light D in the form of a parallel light beam is forwardly emitted toward the liquid crystal display board through the transparent substrate 1 and the coated layer 2 with substantially uniform brightness over the whole surface of the transparent substrate 1. Consequently, an operator sitting in front of the liquid crystal display board can visually clearly recognize characters, numerals and so forth on the screen of the liquid crystal display board.

As the fluorescent lamps 6 are continuously turned on, the transparent substrate 1 becomes hot due to transmission of heat from the fluorescent lamps 6. However, since air flows from the bottom toward the top of the transparent substrate 1 under a so-called chimney effect, as represented by reference numeral 10 in FIG. 1, the transparent substrate 2 is effectively cooled by the air flow 10.

Figure 3:
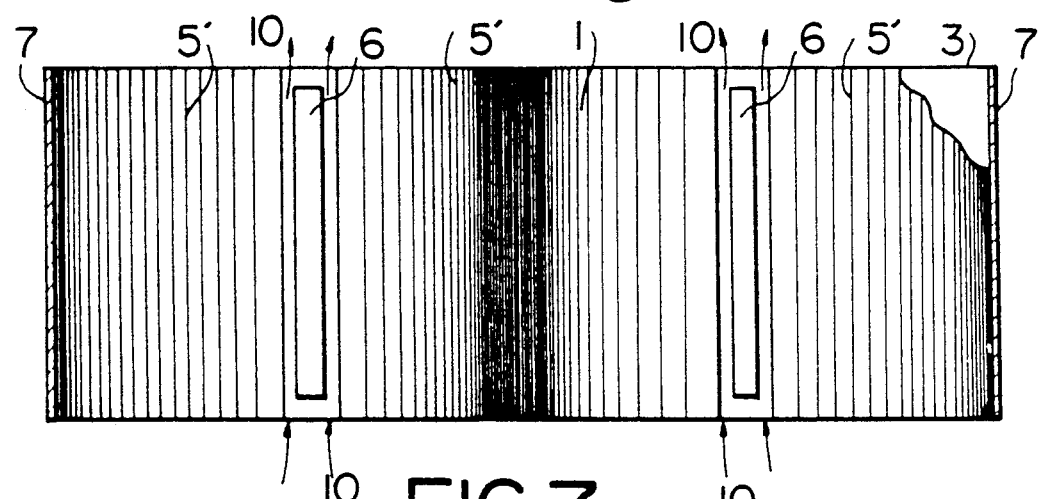
FIG. 3 is a vertical sectional view of the main body taken along line III—III in FIG. 1, particularly illustrating a number of light reflecting means arranged in a straight line-shaped pattern.

In the embodiment shown in FIG. 1, the light reflecting means 5 are arranged in a dot-shaped pattern as viewed from the front side. However, the present invention should not be limited only to this. Alternatively, the light reflecting means 5 may be arranged in a straight line-shaped pattern, as shown in FIG. 3. As is apparent from the drawing, the number of straight lines decreases more and more as each line shifts close to each fluorescent lamp 6. To the contrary, the number of lines increases more and more as each line shifts away from the fluorescent lamp 6. Also according to the embodiment of the present invention shown in FIG. 3, the liquid crystal display board is substantially uniformly illuminated with light forwardly emitted from the light reflecting means 5 in the transparent substrate 1 through the coated layer 2 with the same advantageous effects as those in the embodiment in FIG. 2.

FIGS. 4-6 illustrated a system for uniformly illustrating a circular liquid crystal display board from the rear side in accordance with a second embodiment of the present invention. FIG. 5 is a vertical sectional view along V—V in FIG. 4 which schematically illustrates a transparent substrate for the system in a case where a large number of light reflecting means 5 are arranged in the form of concavities and convexities in a dot-shaped pattern as viewed from the front side. FIG. 6 is a vertical sectional view along VI-VI in FIG. 4 which schematically illustrates a transparent substrate for the system in a case where a large number of light reflecting means are arranged in the form of annular concavities and convexities in a concentric circular line-shaped pattern as viewed from the front side. AS is apparent from the drawings, in this embodiment, the transparent substrate 1 is designed in a circular disc-shaped configuration.

As shown in FIG. 4 a single light source 6 is located at the central part of the transparent substrate 1, and a mounting plate 8 made of metallic material for mounting the light source 6 is formed with a number of axially extending fins 9 in order to radiate heat generated by the light source 6 to the outside for the purpose of cooling the transparent substrate 1.

Generally, brightness on the transparent substrate 1 decreases in inverse proportion to a square of the distance as measured from the light source 6. However, since a density of distribution of the light reflecting means 5 per unit area, which are deposited on the coated layer 3 by employing a conventional screen printing process or the like, is determined to increase in inverse proportion to a square of the distance as measured from the light source 6 in the entirely same manner as in the foregoing embodiment of the present invention, a liquid crystal display board (not shown) placed in front of the transparent substrate 1 is substantially uniformly illuminated with light forwardly emitted from the light reflecting means 5 through the coated layer 2.

The operation of the system in this embodiment is the same as that of the system in accordance with the foregoing embodiment. Thus, repeated description will not be required.

Figure 7:
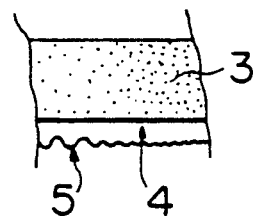
FIG. 7 is a fragmentary enlarged sectional view of the main body for the system of the present invention.

FIG. 7 is a fragmentary enlarged sectional view of the transparent substrate for the system in accordance with the aforementioned embodiments of the present invention, particularly illustrating in detail a laminated structure of the main body A which is an essential component of the system. As is apparent from the drawing, the laminated structure of the main body A comprises a transparent substrate 1, a coated layer 2 on the front side made of transparent resin having a refractive index different from that of the transparent substrate 1, a coated layer 3 on the rear side made of transparent resin having a refractive index different from that of the transparent substrate 1, a rugged layer 4 made of another transparent resin preferably employable for forming an underlying layer and a number of light reflecting means 5 in the form of concavities and convexities formed on the rugged layer 4.

The present invention has been described above with respect to a case where the system is used for uniformly illuminating a liquid crystal display board which has been widely employed as a display means for a word processor, a personal computer and so forth. However, the present invention should not be limited only to a liquid crystal display board. Alternatively, an object to be uniformly illuminated may be a number plate for a motorcar wherein the number plate has a plurality of characters and numerals punched from a base plate made of metallic material so as to indicate a specific car number allocated to the motorcar. In this case, with the system of the present invention, the punched characters and numerals are uniformly illuminated from the rear side in the nighttime when lamps are turned on so that the number plate is visually clearly recognized by a person at a remote location in front of the motorcar.

While the present invention has been described above with respect to two preferred embodiments, it should of course be understood that the present invention should not be limited only to those embodiment but various changes or modifications may be made without departure from the scope of the invention as defined by the appended claims.

What is claimed is:

1. A system for uniformly illuminating a rectangular liquid crystal display board from the rear side, wherein said system includes a rectangular main body located behind said liquid crystal display board in a spaced relationship, said main body having a configuration substantially identical to that of the liquid crystal display board and including;

a single rectangular transparent substrate made of transparent resin, a first coated layer deposited on the front surface of said transparent substrate with transparent resin, said first coated layer having a refractive index different from that of the transparent substrate, a second coated layer deposited on the rear surface of the transparent substrate with transparent resin, said second coated layer having a refractive index different from that of the transparent substrate, a rugged layer deposited on the second coated layer with transparent resin suitably employable for forming an underlying layer, said rugged layer including a number of light reflecting means in the form of concavities and convexities on the front surface of said rugged layer for irregularly reflecting light from each light source, said light reflecting means being distributed with a density per unit area which increases in inverse proportion to a square of the distance as measured from each light source to keep brightness substantially uniform over the whole surface of the transparent substrate, and a plurality of light sources for generating light to be irradiated in the interior of the transparent substrate.

2. The system as claimed in claim 1, wherein said light reflecting means are formed in a dot-shaped pattern as viewed from the front side.

3. The system as claimed in claim 1, wherein the said light reflecting means are formed in a straight line-shaped pattern as viewed from the front side.

4. The system as claimed in claim 1, wherein said plurality of light sources comprising a plurality of fluorescent lamps, each one of said plurality of fluorescent lamps being arranged in the transparent substrate in a spaced relationship from the others of said plurality of fluorescent lamps.

5. The system as claimed in claim 1, wherein said plurality of light sources comprising a plurality of fluorescent lamps being arranged outside of the transparent substrate along four sides thereof.

6. A system for uniformly illuminating a circular liquid crystal display board from the rear side, wherein said system includes a circular main body located behind said liquid crystal display board in a spaced relationship, said main body having a configuration substantially identical to that of the liquid crystal display board and including;

a single circular transparent substrate made of transparent resin, a first coated layer deposited on the front surface of said transparent substrate with transparent resin, said first coated layer having a refractive index different from that of the transparent substrate, a second coated layer deposited on the rear surface of the transparent substrate with transparent resin, said second coated layer having a refractive index different from that of the transparent substrate, a rugged layer deposited on the second coated layer with transparent resin suitably employable for forming an underlying layer, said rugged layer including a number of light reflecting means in the form of concavities and convexities on the front surface of the rugged layer for irregularly reflecting light from a light source, said light reflecting means being distributed with a density per unit area which increases in inverse proportion to a square of the distance as measured from said light source to keep brightness substantially uniform over the whole surface of the transparent substrate, and a single light source disposed at the central part of the transparent substrate for generating light to be irradiated in the interior of the transparent substrate.

7. The system as claimed in claim 6, wherein said light reflecting means are formed in a dot-shaped pattern as viewed from the front side.

8. The system as claimed in claim 6, wherein said light reflecting means are formed in a concentric circular line-shaped pattern as viewed from the front side.

* * * * *